(12) United States Patent  
Liu et al.

(10) Patent No.: US 9,515,414 B1
(45) Date of Patent: *Dec. 6, 2016

(54) WATERPROOF ADAPTER

(71) Applicant: OTTER PRODUCTS, LLC, Fort Collins, CO (US)

(72) Inventors: Feng S. Liu, San Diego, CA (US); George N. Popa, III, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,355

(22) Filed: Aug. 2, 2016

Related U.S. Application Data

(63) Continuation of application No. 14/971,737, filed on Dec. 16, 2015, now Pat. No. 9,437,962, which is a continuation of application No. 14/468,145, filed on Aug. 25, 2014, now Pat. No. 9,300,078.

(60) Provisional application No. 61/869,622, filed on Aug. 23, 2013, provisional application No. 61/871,207, filed on Aug. 28, 2013, provisional application No. 61/974,399, filed on Apr. 2, 2014.

(51) Int. Cl.
  H01R 13/52  (2006.01)
  G02B 6/38  (2006.01)
  H01R 24/58  (2011.01)
  H01R 31/06  (2006.01)

(52) U.S. Cl.
  CPC ......... *H01R 13/5219* (2013.01); *G02B 6/389* (2013.01); *G02B 6/3816* (2013.01); *G02B 6/3825* (2013.01); *H01R 24/58* (2013.01); *H01R 31/06* (2013.01)

(58) Field of Classification Search
  CPC ............ H01R 13/5219; H01R 13/5208; H01R 13/5202; H01R 13/52; H01R 13/5205; H01R 24/58; H01R 31/06; G02B 6/3816; G02B 6/3891; G02B 6/3893; G02B 6/3894; G02B 6/3897
  See application file for complete search history.

(56) References Cited

U.S. PATENT DOCUMENTS

| | | |
|---|---|---|
| 2,851,670 A | 9/1958 | Senior |
| 3,143,384 A | 8/1964 | Senior |
| 3,521,216 A | 7/1970 | Jerair |
| 3,689,866 A | 9/1972 | William |
| 3,922,477 A | 11/1975 | Glowacz |
| 4,335,930 A | 6/1982 | Feldman |
| 4,440,464 A | 4/1984 | Spinner |

(Continued)

Primary Examiner — Gary Paumen

(57) ABSTRACT

An accessory connector configured to provide a liquid-tight seal when inserted into a connector aperture of a waterproof housing for a mobile electronic device. The accessory connector includes a connector extending from a body of the accessory connector, the body configured to allow a user to grasp the accessory connector during insertion or removal of the connector into or from a corresponding connector of the mobile electronic device. The accessory connector further includes a waterproof adapter configured to provide the liquid-tight seal between the connector aperture of the waterproof housing and the accessory connector of the accessory device. The waterproof adapter including two or more tension tabs and an exterior gasket on the exterior surface of the waterproof adapter.

20 Claims, 11 Drawing Sheets

(56) References Cited

U.S. PATENT DOCUMENTS

| | | |
|---|---|---|
| 4,584,718 A | 4/1986 | Fuller |
| 4,649,453 A | 3/1987 | Iwasawa |
| 4,683,587 A | 7/1987 | Silverman |
| 5,167,522 A | 12/1992 | Behning |
| 5,177,515 A | 1/1993 | Tsukamoto |
| 5,423,692 A | 6/1995 | Francis |
| 5,583,742 A | 12/1996 | Noda et al. |
| 5,586,176 A | 12/1996 | Peck |
| 5,660,566 A | 8/1997 | Ohsumi |
| 5,889,730 A | 3/1999 | May |
| 5,956,291 A | 9/1999 | Nehemiah et al. |
| 6,031,524 A | 2/2000 | Kunert |
| 6,068,119 A | 5/2000 | Derr et al. |
| 6,311,017 B1 | 10/2001 | Mori |
| 6,396,769 B1 | 5/2002 | Polany |
| 6,398,585 B1 | 6/2002 | Fukuda |
| 6,614,722 B2 | 9/2003 | Polany et al. |
| 6,739,759 B1 | 5/2004 | Seeley |
| 6,819,866 B2 | 11/2004 | Silva |
| 6,848,930 B2 | 2/2005 | Fukuda |
| 6,913,201 B1 | 7/2005 | Wagner et al. |
| 6,954,405 B2 | 10/2005 | Polany et al. |
| 7,033,215 B2 | 4/2006 | Kobayashi |
| 7,048,561 B1 | 5/2006 | Elbaz |
| 7,180,735 B2 | 2/2007 | Thomas et al. |
| 7,263,032 B2 | 8/2007 | Polany et al. |
| 7,303,418 B2 | 12/2007 | O'Connor |
| 7,312,984 B2 | 12/2007 | Richardson et al. |
| 7,448,908 B2 | 11/2008 | Iwahori et al. |
| 7,535,799 B2 | 5/2009 | Polany et al. |
| 7,688,580 B2 | 3/2010 | Richardson et al. |
| 7,755,975 B2 | 7/2010 | Pettersen et al. |
| 7,775,354 B2 | 8/2010 | Latchford et al. |
| 8,210,859 B2 | 7/2012 | Tiberghien et al. |
| 8,223,997 B2 | 7/2012 | Wilson, II et al. |
| 8,611,969 B2 | 12/2013 | Smith et al. |
| 9,398,365 B2 * | 7/2016 | Liu .................. H01R 24/58 |
| 2003/0095374 A1 | 5/2003 | Richardson |
| 2007/0146985 A1 | 6/2007 | Mick et al. |
| 2007/0261978 A1 | 11/2007 | Sanderson |
| 2007/0280053 A1 | 12/2007 | Polany et al. |
| 2008/0171456 A1 | 7/2008 | Vanzo |
| 2009/0009945 A1 | 1/2009 | Johnson et al. |
| 2009/0017884 A1 | 1/2009 | Rotschild |
| 2009/0028535 A1 | 1/2009 | Funahashi et al. |
| 2009/0034169 A1 | 2/2009 | Richardson et al. |
| 2010/0144194 A1 | 6/2010 | Umei et al. |
| 2010/0313485 A1 | 12/2010 | Kuo |
| 2011/0300730 A1 | 12/2011 | Someya |
| 2011/0300731 A1 | 12/2011 | Nakamura |
| 2012/0100737 A1 | 4/2012 | Frey |
| 2012/0196464 A1 | 8/2012 | Lu |
| 2012/0211382 A1 | 8/2012 | Rayner |
| 2012/0314354 A1 | 12/2012 | Rayner |
| 2013/0084728 A1 | 4/2013 | Omae et al. |
| 2013/0182881 A1 | 7/2013 | Horino et al. |
| 2013/0220841 A1 | 8/2013 | Yang |
| 2013/0224993 A1 | 8/2013 | Purdy |
| 2014/0038443 A1 | 2/2014 | Campbell et al. |
| 2014/0213088 A1 | 7/2014 | Furuya et al. |
| 2014/0248787 A1 | 9/2014 | Suzuki et al. |

* cited by examiner

WATERPROOF ADAPTER

CROSS-REFERENCE TO RELATED APPLICATIONS

This application is a continuation of U.S. application Ser. No. 14/971,737, filed Dec. 16, 2015, which is a continuation of U.S. application Ser. No. 14/468,145, filed Aug. 25, 2014, now U.S. Pat. No. 9,300,078, which claims the benefit of U.S. Provisional Patent Application No. 61/869,622 filed on Aug. 23, 2013, U.S. Provisional Patent Application No. 61/871,207 filed on Aug. 28, 2013, and U.S. Provisional Patent Application No. 61/974,399 filed on Apr. 2, 2014, each of which is incorporated by reference in its entirety as if set out fully herein.

FIELD

This disclosure relates generally to waterproof housings for mobile electronic devices and waterproof adapters for connecting accessory devices to the mobile electronic devices encased within the waterproof housings while not compromising the waterproof nature of the housings.

BACKGROUND

Mobile electronic devices, such as smartphones, portable media players, personal computers, e-readers, tablet computers, and digital audio players, are becoming increasingly important in peoples' day-to-day lives. People rely on mobile electronic devices to communicate with others, engage in commerce, listen to music, watch videos, and manage personal calendars, just to name a few. Due to the high cost of mobile electronic devices, there is a strong incentive to protect these devices from physical damage. Protective cases are readily available, but most of these cases are designed to simply protect electronic devices from drop and crush-induced damage and do not provide sufficient protection against liquid intrusion. For cases that protect against liquid intrusion, connection of a corded accessory device, such as corded headphones or fitness sensors, typically requires opening a port door on the case, which creates an opening for liquid intrusion and renders the case no longer waterproof.

SUMMARY

In one aspect, an accessory connector is configured to provide a liquid-tight seal when inserted into a connector aperture of a waterproof housing for a mobile electronic device. The accessory connector includes a connector extending from a body of the accessory connector, the body configured to allow a user to grasp the accessory connector during insertion or removal of the connector into or from a corresponding connector of the mobile electronic device. The accessory connector further includes a waterproof adapter configured to provide the liquid-tight seal between the connector aperture of the waterproof housing and the accessory connector of the accessory device. The waterproof adapter including two or more tension tabs and an exterior gasket on the exterior surface of the waterproof adapter.

In another aspect, a waterproof adapter can be configured to provide a liquid-tight seal between a waterproof case for a mobile electronic device and an accessory connector of an accessory device. The waterproof adapter can include a body having an exterior surface and a hole passing through a centerline axis of the body, where the hole defines an interior surface of the body. The waterproof adapter can also include two or more tension tabs extending from a first end of the body, where each tension tab comprises a lip portion that extends outwardly relative to the axis of the body. The waterproof adapter can include an exterior gasket channel on the exterior surface of the body, where the exterior gasket channel circumscribes the exterior surface of the body. An exterior gasket can be disposed within the exterior gasket channel on the exterior surface of the body. The waterproof adapter can also include an interior gasket seat on the interior surface of the body of the waterproof adapter.

In certain embodiments, the body can include an attachment feature on its interior surface of the body. The attachment feature can be configured to mate with a corresponding attachment feature on an accessory connector (e.g. a jack plug connector) for an accessory device (e.g. corded headphones) to establish a compressive force between the accessory connector and the waterproof adapter to establish a liquid-tight seal by compressing a gasket between corresponding gasket seating surfaces on the accessory connector and the waterproof adapter.

In some embodiments of the waterproof adapter, the attachment feature of the waterproof adapter can include a threaded feature. In other embodiments, the attachment feature of the waterproof adapter can include two or more bayonet-style mounting features. In certain embodiments, each tension tab further includes a notch proximate the lip portion, each notch configured to receive an aperture protrusion extending from an inner surface of a connector aperture of the waterproof case. In some embodiments, each tension tab further comprises a protrusion proximate the lip portion, each protrusion configured to associate with a notch proximate a connection aperture of the waterproof case. In certain embodiments, the exterior gasket is an O-ring constructed from a suitable elastomer material.

In one aspect, a waterproof adapter can include a body having an interior surface, an exterior surface, and a hole passing through a centerline axis of the body. The waterproof adapter can also include two or more tabs, each tab having a lip extending outward from the centerline axis. An exterior gasket can be installed on the exterior surface of the body, and an interior gasket can be installed on the interior surface of the body.

In some embodiments, the body of the waterproof adapter further includes a first attachment feature on the interior surface of the body, where the first attachment feature on the body is configured to attach to a second attachment feature on an accessory connector of an accessory device to form a liquid-tight seal between the interior gasket and a gasket seat on the accessory connector. In some embodiments, the first attachment feature comprises a threaded feature. In certain embodiments, the first attachment feature comprises a bayonet-style mounting feature.

In certain embodiments of the waterproof adapter disclosed herein, each tension tab further includes a notch proximate each lip portion, each notch configured to associate with a corresponding aperture protrusion on an inner surface of a connector aperture in a waterproof housing for a mobile electronic device. In some embodiments, each tension tab further includes a protrusion proximate each lip portion, each protrusion configured to associate with a notch on an inner surface of a connector aperture of a waterproof housing for a mobile electronic device. In certain embodiments, the exterior gasket is positioned at least partially within a channel on the exterior surface of the waterproof adapter.

In one aspect, a housing for encasing an object is provided. The object may be any object that is in need of protecting from one or more adverse environmental conditions, inclement weather, mishandling and/or damage, such as from contacting a fluid, such as water, and/or from droppage. The object may be a device, e.g., an electronic device, and the housing a casing within which the electronic device is housed; or the object may be a single component or several components of which the device, e.g., the electronic device, is comprised. For instance, the housing may be a housing within which an electronic device, such as a mobile phone or tablet computer, is to be fitted; or the housing may be the actual housing that encases the components of the mobile phone or tablet computer. The housing may be of any appropriate size and dimension so long as it is capable of housing the object and protecting it, for instance, from adverse environmental conditions and/or rough treatment.

The housing may be in the form of any typical container known and used in the art for containing the particular object. For instance, the container may be a cargo or transport container configured for opening and closing, a suitcase, a briefcase, a messenger container, a food or drink container, a medicine container, first aid kit, a cooler container, a heating container, or any other form of container meant to contain an object or objects and prevent it or them from being damaged due to environmental factors and/or mishandling.

In another aspect, an accessory connector is configured to provide a liquid-tight seal when inserted into a connector aperture of a waterproof case for a mobile electronic device. The accessory connector can include a jack plug extending from a body, the body being configured to allow a user to grasp the accessory connector during insertion or removal of the jack plug into a jack of a mobile electronic device. The connector can also include two or more tension tabs extending from a first end of the body, each tension tab comprising a lip portion that extends outwardly relative to a centerline axis of the jack plug. The accessory connector can include an exterior gasket channel on an exterior surface of the body, and the exterior gasket channel can circumscribe the exterior surface of the body. An exterior gasket can be disposed within the exterior gasket channel on the exterior surface of the body of the accessory connector.

In some embodiments of the accessory connector for an accessory device, each tension tab further comprises a receiving notch. Each receiving notch can be configured to receive a corresponding aperture protrusion located on an inner surface of a connector aperture of the waterproof case when the accessory connector is inserted into the connector aperture of the waterproof case.

A protective housing for a mobile electronic device can include a housing that is configured to cover at least part of a mobile computing device comprising an electrical or optical connection. The protective housing can further include a connector aperture passing through an exterior surface of the encasement. The connector aperture can be located proximate to the electrical or optical connection of the mobile electronic device when the mobile electronic device is installed in the housing. The protective housing can also include at least one aperture protrusion disposed within the connector aperture. The at least one aperture protrusion can extend from an inner surface of the connector aperture.

In some embodiments, the connector aperture in the protective housing can be configured to receive a waterproof adapter that is configured to provide a liquid-tight seal within the connector aperture. The waterproof adapter can be attached to an accessory connector of an accessory device (e.g. a jack plug connector of a pair of headphones). In such embodiments, the waterproof adapter can include a body having an exterior surface and a hole passing through a centerline axis of the body. The hole can define an interior surface of the body of the waterproof adapter. The waterproof adapter can include two or more tension tabs extending from a first end of the body, where each tension tab includes a lip portion that extends outwardly relative to the centerline axis of the body. The waterproof adapter can include an exterior gasket channel proximate the exterior surface of the body. The exterior gasket channel can circumscribe the exterior surface of the body. An exterior gasket can be disposed within the exterior gasket channel on the exterior surface of the body and can be configured to press against an inner surface of the connector aperture to provide a liquid-tight seal therewith.

The connector aperture in the protective housing can be configured to receive an accessory connector for an accessory device, the accessory connector configured to provide a liquid-tight seal when inserted into the connector aperture. In some examples, the accessory connector can includes a jack plug extending from a body of the accessory connector. The body can be configured to allow a user to grasp the accessory connector during insertion or removal of the jack plug into a corresponding jack of a mobile electronic device when the mobile electronic device is installed in the protective housing. The accessory connector can also include two or more tension tabs extending from a first end of the body. Each tension tab can include a lip portion that extends outwardly relative to a centerline axis of the jack plug. The accessory connector can also include an exterior gasket channel disposed within an exterior surface of the body, where the exterior gasket channel circumscribes the exterior surface of the body. An exterior gasket can be disposed within the exterior gasket channel on the exterior surface of the body of the accessory connector. The exterior gasket can be configured to press against the inner surface of the connector aperture to provide a liquid-tight seal therewith.

DETAILED DESCRIPTION

Liquids can damage sensitive electrical components within mobile devices. It is therefore desirable to develop an apparatus that prevent liquids from contacting sensitive electrical components while also not interfering with the functionality or usability of the mobile device. A wide variety of protective cases are available for mobile devices, but most fail to provide sufficient protection against liquid intrusion. Those cases that do protect against liquid intrusion typically fail to remain waterproof when a user accesses a physical feature of the electronic device. For example, if a user wants to listen to music through headphones while jogging, the user must open an access port on the case and insert a headphone plug into a headphone jack (i.e. a physical feature) of the mobile device. The access port on the case remains open while headphone plug is connected to the headphone jack in the electronic device. As a result, the case is not waterproof during this period of time, and the electronic device is susceptible to liquid intrusion from, for example, rain while the user is jogging. To avoid this outcome, it is desirable to develop an apparatus that enables the case to remain waterproof even when the user is accessing certain physical features of the electronic device, such as a headphone jack or other electrical connector, when the electronic device is housed within the case.

Figure 7A:
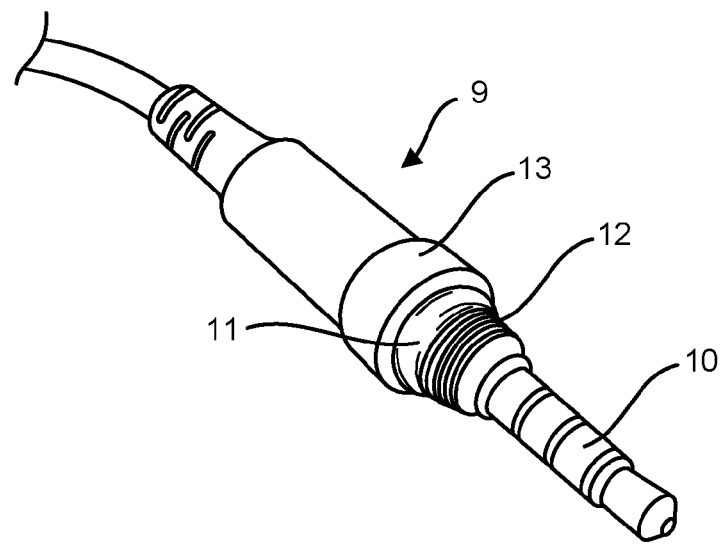
FIG. 7A shows an accessory connector with a threaded feature.
Figure 7B:
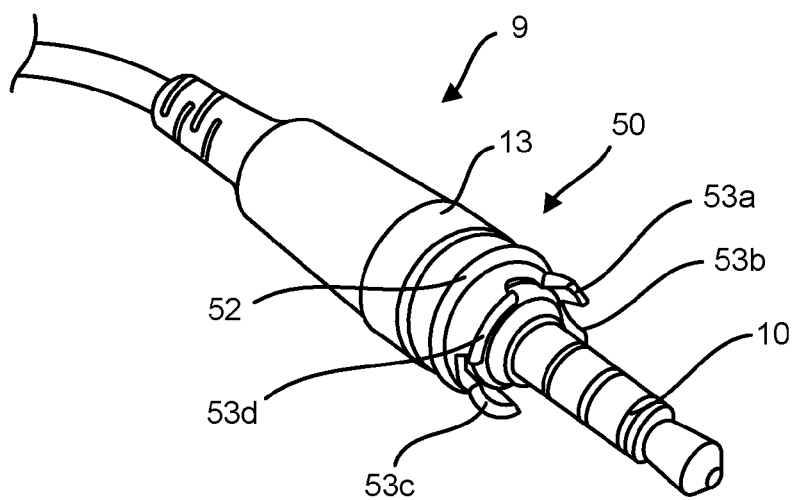
FIG. 7B depicts the waterproof adapter of FIGS. 6A-C threaded onto the accessory connector of FIG. 7A.
Figure 8A:
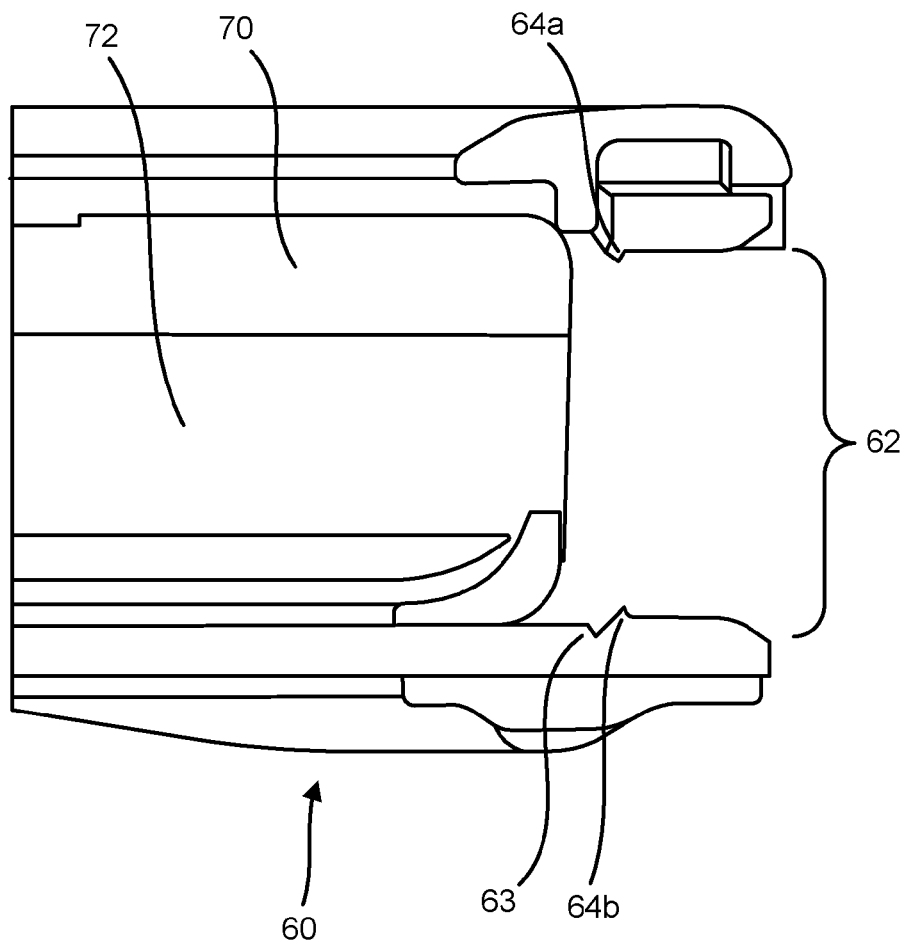
FIG. 8A shows a side cutaway view of a connector aperture in a housing configured to encase and protect a mobile electronic device.
Figure 8B:
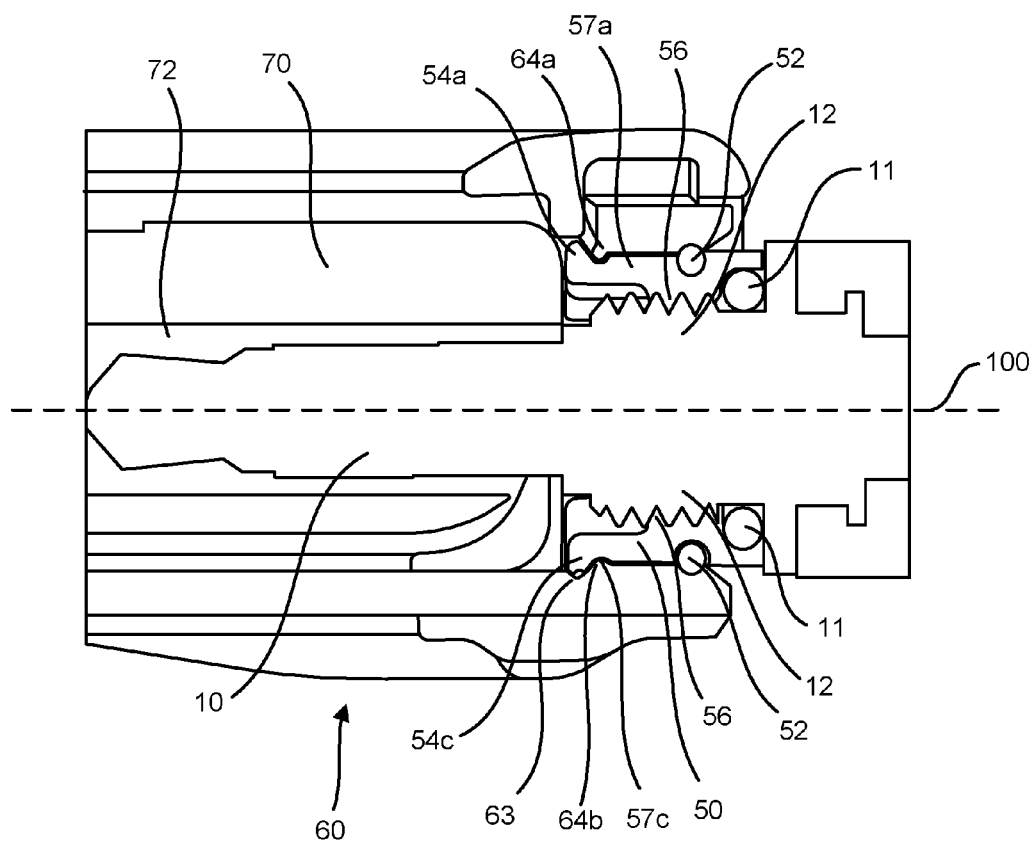
FIG. 8B shows a side cutaway view of a waterproof adapter attached to an accessory connector, where the accessory connector is inserted into a connector aperture in a housing containing a mobile electronic device.

A waterproof or water-resistant housing 60, as shown in FIGS. 8A-B, can be configured to encase and protect a mobile electronic device 70 from liquid intrusion. The housing 60 can include an aperture 40 that allows a user to access a feature (e.g. jack, switch, fingerprint scanner, or touchscreen) associated with the mobile electronic device 70 while the device remains encased in and protected by the housing. Through the aperture 40 in the housing 60, the user can connect an accessory device (e.g. headphones, microphone, speaker, battery charger, external data storage device, auxiliary antenna, global positioning system (GPS), heart rate sensor, cadence sensor, etc.) to a jack 72 (e.g. female connector) in the mobile electronic device (see, e.g. FIG. 8B). In certain instances, a liquid-tight seal can be formed by coupling an accessory connector (e.g. the accessory connector 9 shown in FIGS. 1 and 7) associated with the accessory device to the housing 60. In other instances, a liquid-tight seal can be formed by inserting a port-sealing bung (e.g. the port-sealing bung 25 shown in FIG. 2 or 5) into the aperture 40.

Figure 1:
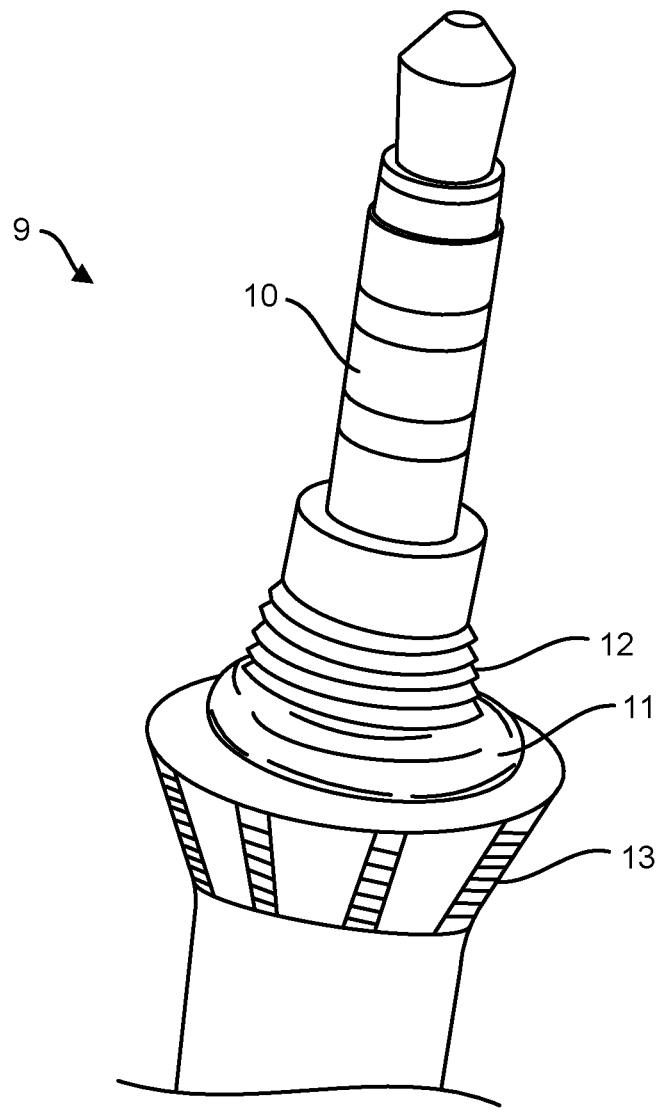
FIG. 1 shows a side perspective view of an accessory connector having a threaded feature.

As illustrated in FIG. 1, an accessory device, such as those mentioned above, can include an accessory connector 9 that permits the accessory device to be electrically connected to the mobile electronic device 70. In one example, the accessory connector 9 can include a jack plug 10 extending from a body 13. The body 13 of the accessory connector can include one or more grasping features (e.g. ridges, knurls, depressions, rubber coating, etc.) that permit a user to easily grasp the accessory connector with their fingers during insertion and removal of the accessory connector. The accessory connector 9 can also include a threaded feature 12 and a jack plug gasket 11. The jack plug gasket 11 can be an O-ring or other suitable sealing component. The accessory connector 9, by way of the threaded feature 12 and jack plug gasket 11, can be configured to provide a liquid-tight seal between the accessory connector and a connector aperture 40 in the housing 60 (see, e.g., FIG. 2), thereby preventing water from entering an interior volume of the housing and damaging sensitive components within the mobile electronic device stored therein.

In some examples, the accessory connector 9 can include a threaded feature 12 (see, e.g., FIG. 1) to permit the accessory connector to removably engage the housing 60, and in other examples, the accessory connector 9 can include cam feature (see, e.g., FIG. 3) to permit the accessory connector to removably engage the housing 60. Where the accessory connector 9 includes a threaded feature 12 or cam feature (such as a bayonet-style locking mechanism), a corresponding threaded feature or cam feature can be included in the connector aperture 40 of the housing 60 (see, e.g., FIGS. 4A, 4B, and 5). The cam feature shown in FIG. 3 can allow the accessory connector 9 to quickly and easily engage the housing 1, thereby providing greater ease of use than a threaded connection.

Figure 3:
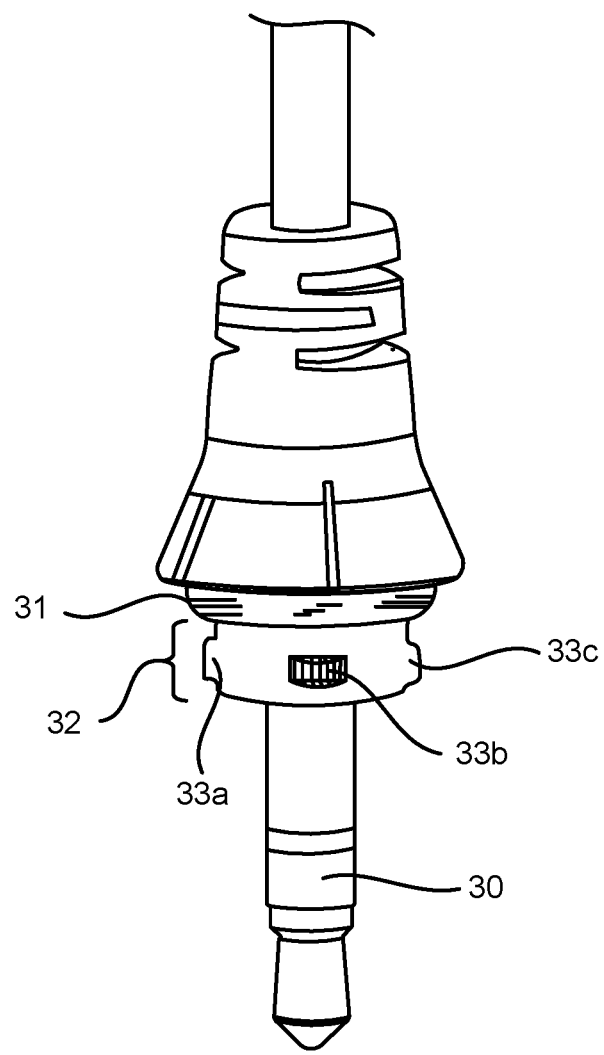
FIG. 3 shows a side view of an accessory connector that has bayonet-style mounting feature.

The jack plug 10 of the accessory connector 9 can include an electronic device interface. In some embodiments, as shown in FIG. 1, the jack plug 10 can be configured to transmit electrical signals, such as audio signals. In some embodiments, the jack plug 10 can include a headphone connector, such as a TS, TRS, or TRRS connector. In some embodiments, the jack plug 10 may be configured to transmit optical signals and may include an EIAJ optical connection (e.g., TOSLINK). In some embodiments, the jack plug 10 may be configured to transmit a combination of electrical and optical data signals. The accessory connector 9 can be configured to pass through a connector aperture 40 of a housing 60 so as to associate with an encased electronic device 70, and also to associate with one or more features within the connector aperture 40 of the housing 60 in such a manner as to establish a liquid-tight seal therewith. In this instance, the accessory connector 9 can include an attachment mechanism that includes a threaded feature 12. In other embodiments, the attachment mechanism can be a bayonet-style mounting mechanism as shown in FIGS. 3 and 4.

FIG. 1 provides a perspective view of a portion of an accessory connector 9 for an accessory device, such as a set of headphones. The accessory connector 9 can include a jack plug 10 and a jack plug gasket 11 installed on or affixed to the jack plug. The accessory connector 9 can be configured to provide a liquid-tight seal between the accessory connector and a connector aperture 40 of a housing 60 for a mobile electronic device. The jack plug gasket 11 can be located against a gasket seating surface associated with the body 13 of the accessory connector 9. The accessory connector 9 can include a threaded feature 12 located between the jack plug 10 and the jack plug gasket 11. The accessory connector 9 can be configured to pass through the connector aperture 40 of the housing 60 so as to associate with an electronic device removably encased within the housing. The accessory connector 9 can be configured to associate with the connector aperture 40 of the housing 60 in such a manner as to establish a liquid-tight seal therewith. In this instance, the accessory connector 9 includes a threaded feature 12, which is configured to interface with a corresponding threaded feature of the connector aperture 40.

Figure 2:
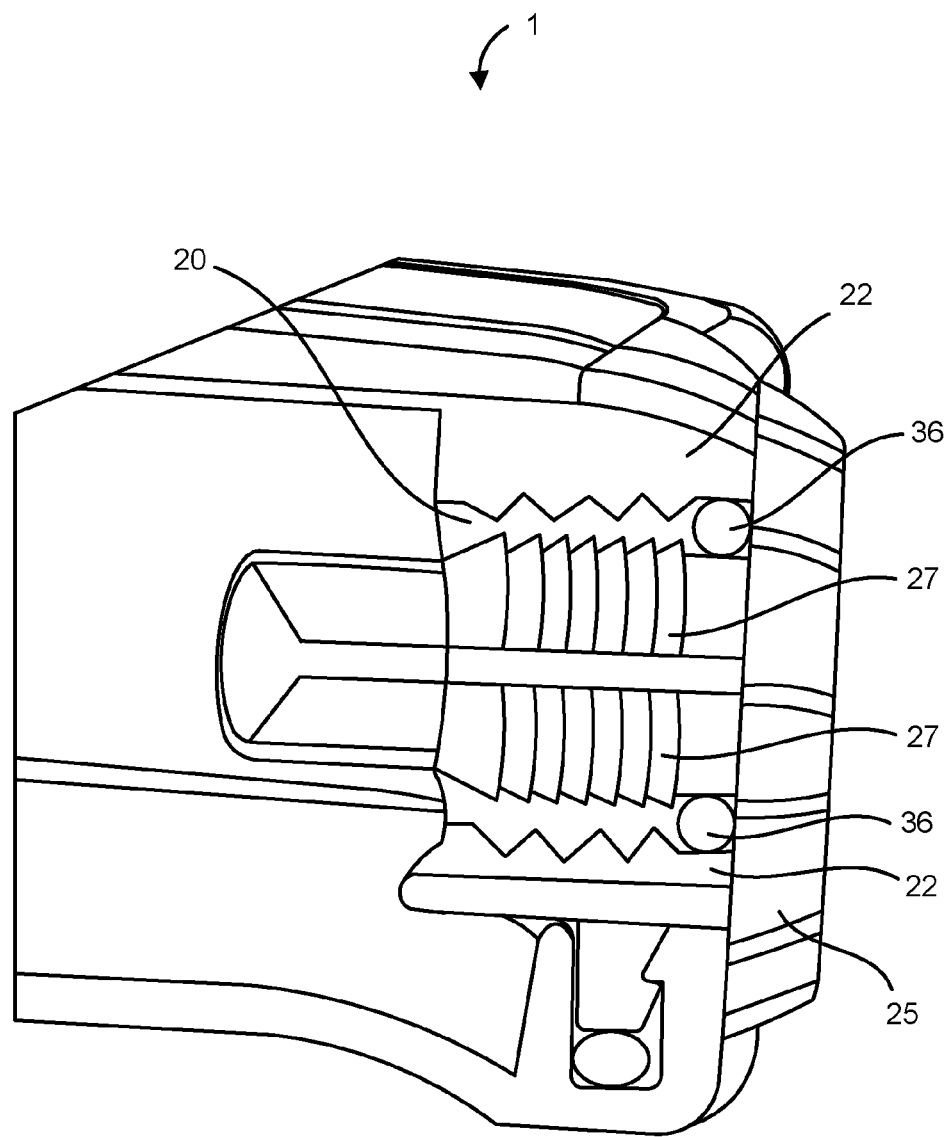
FIG. 2 shows a side cutaway view of a housing for a mobile electronic device, the housing having a threaded connector aperture into which a threaded bung can be installed.

FIG. 2 provides a side cutaway view of a threaded connector aperture 40 into which a threaded port-sealing bung 25 or threaded accessory connector 9 (see FIG. 1) may be threaded. In FIG. 2, the threaded port-sealing bung 25 is installed in the connector aperture 40 to prevent entry of liquids, dust, or debris into the housing 60 when an accessory device 9 is not occupying the connector aperture 40. For example, if a user has disconnected her headphones from the mobile electronic device, the user can install the threaded port-sealing bung 25 into the connector aperture 40 to prevent entry of liquids, dust, or debris into the housing 60. The port sealing bung 25 can include a bung gasket 36 which enhances the liquid-tight seal.

In order for the jack plug 10 of the accessory connector 9 shown in FIG. 1 to be inserted into the connector aperture 40 of the housing 60 of FIG. 2, the port-sealing bung 25 is unscrewed from the connector aperture 40. The threaded feature 12 of the accessory connector 9 can then be screwed into a corresponding threaded feature of the connector aperture 40. To avoid losing or misplacing the port-sealing bung 25 while it is removed from the connector aperture 40, the port-sealing bung 25 can include a tether that attaches to the housing 1, similar to the tether 910 shown in FIG. 9.

Figure 4A:
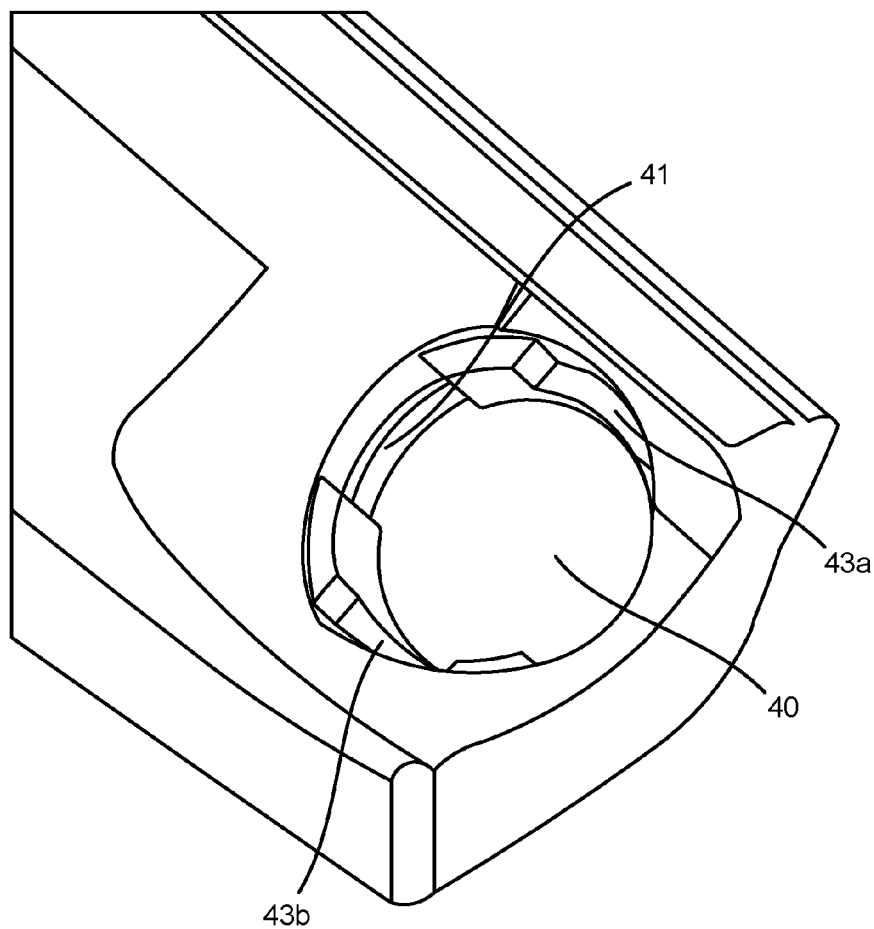
FIG. 4A shows a close-up perspective view of a housing for a mobile electronic device, the housing having connector aperture with a bayonet-style mounting feature.
Figure 4B:
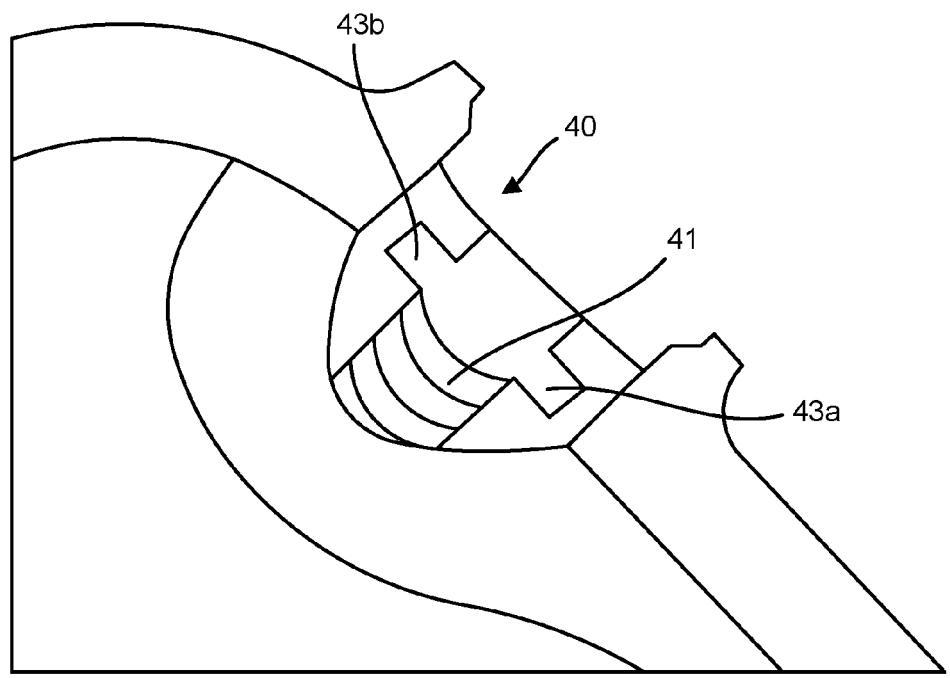
FIG. 4B shows a cutaway view of a housing for a mobile electronic device, the housing having connector aperture with a bayonet-style mounting feature and a threaded mounting feature.

FIG. 3 provides a side view of an embodiment of an accessory connector 9 with a jack plug 30 and a bayonet-style mounting feature 32. The accessory connector 9 can include a jack plug gasket 31 that can be any suitable removable gasket (e.g. an O-ring) or non-removable gasket (e.g. a formed-in-place gasket associated with a body of the accessory connector). The accessory connector 9 can include one or more cam features 33*a-d* (33*d* not visible in FIG. 3) extending radially from the accessory connector. In some embodiments, one, two, three, four, five, or more cam features may extend radially from the accessory connector 9. Where the accessory connector includes cam features, such as 33*a-d*, corresponding cam receiving features 43*a-d* can be included in the connector aperture 40 of the housing, as shown in FIGS. 4A and 4B. The jack plug 30 of the accessory connector shown in FIG. 3 is configured to pass through the connector aperture 40 of the encasement or housing so as to associate with a jack in an encased electronic device. As shown in FIG. 3, the accessory connector can include cam features 33*a-d* that are adapted to engage corresponding cam receiving features 43*a-b* (see FIGS. 4A and 4B) of the connector aperture 40 of the housing 60 so as to establish a liquid-tight seal with the aid of the jack plug gasket 31.

FIG. 4A provides a close-up perspective view of a portion of a housing 60 with a connector aperture 40 having bayonet-style mounting features disposed within the connector aperture. The connector aperture 40 can include cam receiving features (e.g. 43*a*, 43*b*) disposed within the wall of the connector aperture. The connector aperture 40 can be adapted to receive either a bung (see, e.g., port-sealing bung 35 shown in FIG. 5) or an accessory connector (see, e.g., accessory connector shown in FIG. 3) with bayonet-style mounting features (e.g. 33*a-d*).

FIG. 4B depicts a cutaway view of a connector aperture 40 with bayonet-style mounting features 43*a* and 43*b* and disposed within the wall of the connector aperture. In some embodiments, the connector aperture 40 includes only a bayonet-style mounting feature and not a threaded feature, as shown in FIG. 4A. When a port-sealing bung 35 or accessory connector 9 is received within the connector aperture 40, a liquid-tight seal is established due to compression of a gasket (e.g. 26) against a gasket seating surface, as shown in FIG. 5.

Figure 5:
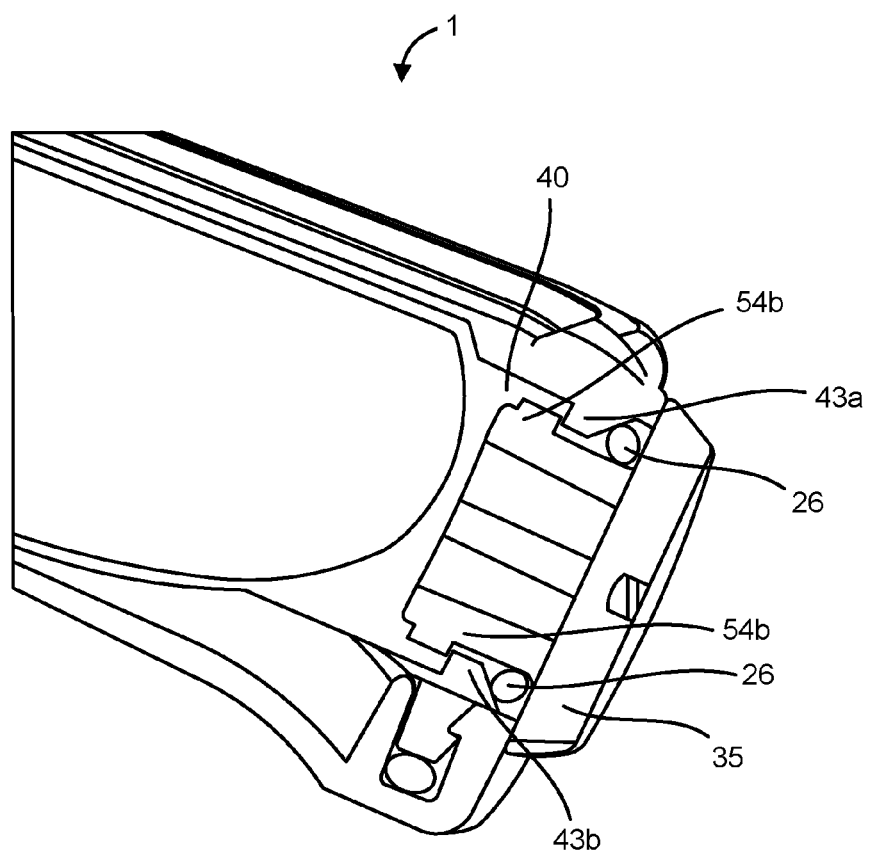
FIG. 5 shows a side cutaway view of a housing for a mobile electronic device, the housing having connector aperture with a bayonet-style mounting feature and port-sealing bung disposed within the connector aperture.

FIG. 5 provides a side cutaway view of a housing 60 with a connector aperture 40 having a bayonet-style mounting feature with a port-sealing bung 35 installed in the connector aperture 40. When the port-sealing bung 35 is installed into the connector aperture 40, the gasket 26 is compressed between a first gasket seating surface located on the bung and a second gasket seating surface located within the connector aperture, thereby forming a liquid-tight seal between the bung and the housing 1.

Another configuration of a waterproof linkage for a data connector includes a linkage that is pressed directly into a receiving feature or port of an encasement or housing without requiring rotation to facilitate coupling (in contrast to the threaded connection shown in FIG. 2 or the bayonet style connection of FIG. 5). The waterproof adapter described herein can be molded directly to the accessory connector 9, or it can be configured as a separate waterproof adapter component (see, e.g. FIGS. 6A-6C) that includes threads, cam features, or other attachment features that allow the adapter to be attached to or installed on the accessory connector in a waterproof manner (see, e.g. FIG. 7B).

In certain instances, it can be desirable to have a quick-connect feature that allows the accessory connector 9 to form a liquid-tight seal against the housing 60 without having to thread or twist the accessory connector into the connector aperture 40, thereby simplifying installation for a user. For instance, it can be desirable to have a quick-connect feature that allows the accessory connector 9 to be pressed into the connector aperture 40 with a single motion, thereby simplifying and speeding the connection process and reducing the likelihood of a partial installation. To achieve this outcome, the connector aperture 40 can be configured to receive a waterproof adapter 50 (see FIGS. 6A-C) that attaches to the accessory connector 9, as shown in FIG. 7B. FIG. 8A shows an example of a portion of a housing having a connector aperture 40 prior to installation of the accessory connector 9 with a quick-connect feature, and FIG. 8B shows an example of a portion of a housing having a connector aperture 40 after installation of an accessory connector 9 with a quick-connect feature.

Figure 6A:
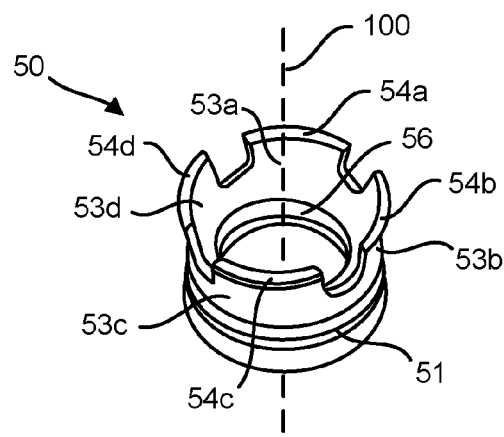
FIG. 6A show a bottom perspective view of a waterproof adapter.
Figure 6B:
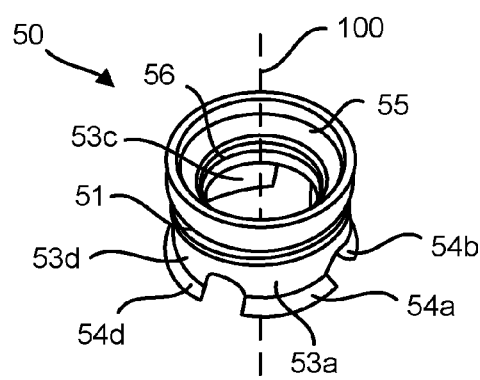
FIG. 6B shows a top perspective view of a waterproof adapter.
Figure 6C:
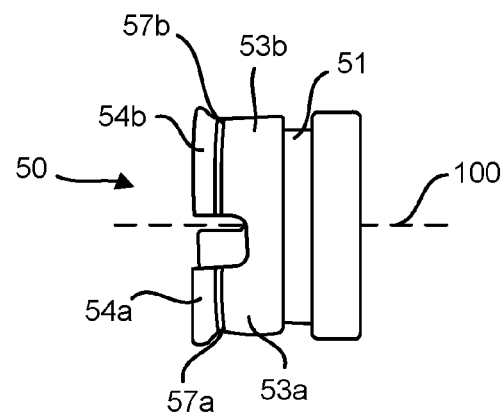
FIG. 6C shows a side view of a waterproof adapter.

FIGS. 6A-C depict several views of a waterproof adapter 50 in the form of a threaded waterproof adapter. FIG. 6A shows a bottom perspective view of a waterproof adapter 50. In one example, the waterproof adapter 50 can have a body 59 with a hollow cylindrical or barrel shape. The waterproof adapter 50 can have an exterior gasket channel 51 located on an outer circumference of the body 59 at or near a middle region of the body. The gasket channel 51 can be configured to receive a gasket or seal 52, such as an O-ring, as shown in FIG. 8B (FIGS. 6A-6C show the waterproof adapter 50 prior to installation of the gasket of seal 52). The bottom side of the waterproof adapter 50 can include a perimeter, and the perimeter can include one, two, three, four, or more tension tabs (53*a-d*) extending therefrom. In one example shown in FIG. 6A, the perimeter of the bottom side of the waterproof adapter 50 can include four tension tabs (53*a-d*) extending therefrom. Each tension tab (53*a-d*) can have a lip portion (54*a-d*) extending outward radially (e.g. flaring outward) from the tension tab (i.e. extending outwardly from a centerline axis 100, as shown in FIGS. 6A-C and 8B). In other embodiments, the number of tension tabs may be two, three, five, or more. The lip portions (54*a-d*) can project outwardly at a predefined angle from the tension tabs (53a-d) and can be configured such that the waterproof adapter 50 may be inserted into a connector aperture 40 of the housing 60 and can be removably secured therein, as shown in the side cutaway view of FIG. 8B. The tension tabs (53a-d) and lip portions (54a-d) enable the waterproof adapter to function as a quick-connect style connector that is affordable and replaceable and can be sterilized (e.g. to permit use in hospital environments).

The lip portions (54a-d) can project outwardly from the tension tabs (53a-d) at any suitable angle. In one example shown in FIG. 6C, the lip portions (54a-d) can project outwardly from their respective tension tabs (53a-d) at an angle of about 45 degrees relative to the centerline axis 100 of the waterproof adapter 50. Depending on considerations relating to ease of insertion, ease of removal, and protection against inadvertent removal, the lip portions (54a-d) can project outwardly from the tension tabs (53a-d) at other suitable angles, such as about 1-15, 15-30, 1-60, 15-60, 15-45, or 30-45 degrees, relative to the centerline axis 100 of the waterproof adapter 50. The lip portions (54a-d) of the tension tabs (53a-d) can have rounded end portions, as shown in FIG. 6C, to ease insertion and removal of the waterproof adapter 50 into the connector aperture 40 of the housing 60. By having smooth, rounded end portions on the lip portions (54a-d) of the tension tabs (53a-d), damage (such as gouges, scratches, or other forms of wear) to inner surfaces of the connection aperture 40 can be reduced or avoided during insertion and removal of the accessory connector 9 to and from, respectively, the connector aperture. Reducing or avoiding damage, such as gouges or scratches, to the inner surface of the connector aperture 40 is desirable, since it ensures the gasket or seal 52 of the waterproof adapter 50 is not abraded during an insertion or removal step thereby promoting the gasket or seal's longevity and also ensuring the gasket or seal is placed in contact with a reliable sealing surface to form a liquid-tight seal when inserted into the connector aperture.

During insertion of the waterproof adapter 50 into the connector aperture 40, the lip portions (54a-d) and tension tabs (53a-d) can deflect inward (slightly) toward the centerline axis 100 of the waterproof adapter. Once inserted, the lip portions (54a-d) can exert an outward force against an inner surface of the connector aperture 40 or, alternatively, a channel or protrusion within the connector aperture or an interior surface of the housing 60 (see FIG. 8). The outward force applied by the lip portions (54a-d) can result from the lip portions and tension tabs (53a-d) attempting to resume their original shapes that existed prior to being deflected inwardly as a result of insertion of the waterproof adapter 50 into the connector aperture 40. The waterproof adapter 50 can have an outer diameter that is slightly smaller than a corresponding inner diameter of the connector aperture 40 to which it mates, thereby establishing an annular gap between the outer surface of the waterproof adapter 50 and an inner wall of the connector aperture 40 upon insertion. The exterior gasket 52 (see FIG. 8B) can have an outer diameter that is larger than the inner diameter of the connector aperture 40. The exterior gasket 52 can fill the annular gap between the outer surface of the waterproof adapter 50 and the inner wall of the connector aperture 40. The exterior gasket 52 can be at least partially compressed against the inner wall of the connector aperture 40 upon insertion of the waterproof adapter 50 into the connector aperture 40, thereby creating a water-tight seal, as shown in FIG. 8B, that prevents liquid from reaching the electronic device through the connector aperture.

Returning to FIG. 6A, the waterproof adapter 50 can be hollow, thereby establishing an inner surface that can include a threaded feature 56. The threaded feature 56 can allow the waterproof adapter 50 to be threaded onto (i.e. threadably engaged with) a corresponding threaded feature 12 of the accessory connector 9. FIG. 7A shows the accessory connector 9 prior to installation of the waterproof adapter 50, and FIG. 7B shows the accessory connector 9 after installation of the waterproof adapter.

FIG. 6B depicts a bottom perspective view of the waterproof adapter 50. An interior gasket seat 55 can exist on an inner circumference of the waterproof adapter 50. The interior gasket seat 55 can be configured to press against a jack plug gasket 11 located on the accessory connector 9 when the waterproof adapter 50 is threaded onto the accessory connector. The jack plug gasket 11 provides a watertight seal between the body 13 of the accessory connector and the waterproof adapter 50 when the waterproof adapter is threaded far enough onto the threaded portion 12 of the accessory connector 9 to sufficiently compress the jack plug gasket between body of the accessory connector and the interior gasket seat 55 of the waterproof adapter. Waterproof adapter 50 may also include a gasket, in addition to or as an alternative to jack plug gasket 11, for forming a seal between waterproof adapter 50 and accessory connector 9.

The waterproof adapter 50 can be removably installed on the accessory connector 9 or can be permanently or semi-permanently affixed to the accessory connector by any suitable process. In some embodiments, an adhesive (e.g. glue, epoxy, LOCTITE) may be applied to the threads of either threaded feature (12, 56) to secure the waterproof adapter 50 to the accessory connector 9. The waterproof adapter 50 may also be welded (e.g. ultrasonically welded) to the threaded feature 12 of the accessory connector 9. In some embodiments, the waterproof adapter 50 may not have a threaded feature to permit engagement with the accessory connector 9 and may instead be adhered, welded, bonded, or otherwise fastened to the accessory connector by any other suitable approach. In some embodiments, the waterproof adapter 50 may be overmolded onto the accessory connector 9 or may be formed as part of the accessory connector. For example, the waterproof adapter 50 can be an integrally formed portion of the accessory connector 9 created by, for example, an injection molding process wherein the body of the accessory connector and the waterproof adapter are formed as a single component. The waterproof adapter 50 can be used with either male or female connectors. For example, if a housing 60 for mobile electronic device includes a male connector, the waterproof adapter 50 may be fitted to the body of a female accessory connector 9, thereby allowing for insertion of the female connector into or through the connector aperture 40 in the housing 60 and sealing the connector aperture against liquid and/or dust intrusion. In some embodiments, a male connector associated with the housing 60 may partially enter the connector aperture 40. In some embodiments, the mobile electronic device itself may include a male connector positioned proximate a connector aperture 40 of the housing 60. In other embodiments, a mobile electronic device housing may be waterproof or water resistant and does not require a separate waterproof or water resistant housing. In such instances, the mobile electronic device may include a male or female connector adapted to receive an accessory connector 9 with a waterproof adapter 50 as disclosed herein.

FIG. 6C depicts a side view of the waterproof adapter 50. The tension tabs (54a-d) can each include receiving notches 57a-d (57c and 57d are not visible in FIG. 6C). The receiving notches 57a-d can be configured to receive corresponding aperture protrusions (e.g. 64a-b) located on an inner surface of the connector aperture 40 (see FIG. 8A). When the aperture protrusions (64a-b) engage the receiving notches (57a-d), the engagement of the respective features can resist removal of the waterproof adapter 50 from the connector aperture 40. The engagement of the aperture protrusions (64a-b) with the receiving notches (57a-d) can provide the user with audible or tactile feedback confirming that installation has been successfully and fully accomplished. An exterior surface of the waterproof adapter 50 can be shaped to complement the shape of an inner surface of the connector aperture 40 to provide a suitable fit and/or a distinctive appearance signifying compatibility. Exemplary cross-sectional geometries of the waterproof adapter 50 can include cylindrical, elliptical, irregular, or polygonal (e.g. triangular, rectangular, pentagonal, hexagonal, heptagonal, octagonal, nonagonal, decagonal, etc.).

FIG. 7A shows a perspective view of an accessory connector 9 having a jack plug 10 and a jack plug gasket 11 located between a connector body 13 and the jack plug 10. The accessory connector 9 can also include a threaded feature 12 located near the jack plug gasket 11. FIG. 7B shows a perspective view of a waterproof adapter 50 secured to the threaded feature 12 of the accessory connector 9. The waterproof adapter 50 includes an exterior gasket or seal 52. In one example, the exterior gasket 52 can be an O-ring. The exterior gasket 52 may be made of a poloxamer or any other suitable polymer (e.g. thermoplastic elastomer) adhered to or overmolded onto the exterior gasket channel 51 located on an outer circumference of the body of the waterproof adapter 50. When the accessory connector 9 of FIG. 7B is installed into the connector aperture 40 of the housing 60, the exterior gasket 52 associated with the waterproof adapter 50 can form a liquid-tight seal against a corresponding gasket seating surface of the connector aperture 40.

In some embodiments, the threaded feature of the waterproof adapter 50 may instead be a bayonet-style attachment feature similar to the bayonet-style mounting feature in the connector aperture 40 depicted in FIGS. 4A-B. The bayonet-style attachment feature may also include one or more cam-receiving features similar to those depicted in FIGS. 4A-B, which correspond to one or more cam features extending radially from the accessory connector (e.g., see FIG. 3). In such embodiments, the bayonet-style attachment feature of the waterproof adapter 50 can receive a bayonet-style mounting feature of the accessory connector 9, such as that depicted in FIG. 3, thereby forming a watertight seal between the waterproof adapter 50 and the accessory connector.

FIG. 8A depicts a side cutaway view of a housing 60 surrounding a mobile electronic device 70. The mobile electronic device includes a female connector 72 adapted to receive a male connector. In one example, the female connector 72 can be a headphone jack configured to receive a jack plug 10. In another example, the female connector 72 can be a charging port, such as a LIGHTNING port or micro-USB port, configured to receive a compatible charging cable or data transfer cable.

FIG. 8B shows a side cutaway view of a mobile electronic device 70 encased in a housing 60. The housing 60 can include a connector aperture 40 configured to receive an accessory connector 9 having a waterproof adapter 50 attached thereto. The connector aperture 40 can include aperture protrusions 64a and 64b that extend inward toward a centerline axis of the connector aperture. A lip receiving notch 63 can be located on an inner surface of the connector aperture 40 and can be adapted to receive one or more lip portions (e.g. 54a-d) of the waterproof adapter 50.

As shown in FIG. 8B, the waterproof adapter 50 can be secured to the accessory connector 9, and the accessory connector can be inserted into the connector aperture 40 of the housing 60. The accessory connector 9 can include a jack plug 10 extending therefrom, and the jack plug can be received by a female connector 72 located within the encased mobile electronic device 70. The accessory connector 9 can include a jack plug gasket 11 that is configured to provide a liquid-tight barrier when pressed against a gasket seat 55 (see FIG. 6B) of the waterproof adapter 50. In some embodiments, the jack plug gasket 11 may be attached to the waterproof adapter 50 (e.g. resting on, adhered to, or overmolded on the gasket seat 55, which is visible in FIG. 6B). An exterior gasket 52, which is located in an exterior gasket channel 51 of the waterproof adapter 50, can form a watertight barrier by compressing against the inner wall of the connector aperture 40. As shown in FIG. 8B, lip portions 54a and 54c can extend into the housing 60 and either beyond an inner perimeter edge of the connector aperture 40 (see, e.g., the position of lip portion 54a with respect to the inner perimeter edge of the connector aperture 40) or into a lip receiving notch 63 on the interior of the encasement (see, e.g., the position of lip portion 54c relative to the lip receiving notch 63). In some embodiments, the housing 60 may include only a lip receiving notch 63. In certain embodiments, the lip receiving notch 63 may be located on an inner surface of the connector aperture 40.

Receiving notches (e.g. 57c) in the waterproof adapter 50 can be configured to receive a corresponding aperture protrusion (e.g. 64b). Physical engagement between the lip portions (e.g. 54a-d) of the waterproof adapter 50 and the lip receiving notches (e.g. 63b) of the adapter resists accidental removal of the accessory connector 9 and waterproof adapter 50 from the connector aperture 40. Similarly, physical engagement between the aperture protrusions (e.g. 64a, 64b) and the receiving notches (e.g. 57c) of the waterproof adapter 50 resists inadvertent removal of the accessory connector 9 and waterproof adapter 50 from the connector aperture 40.

Figure 9:
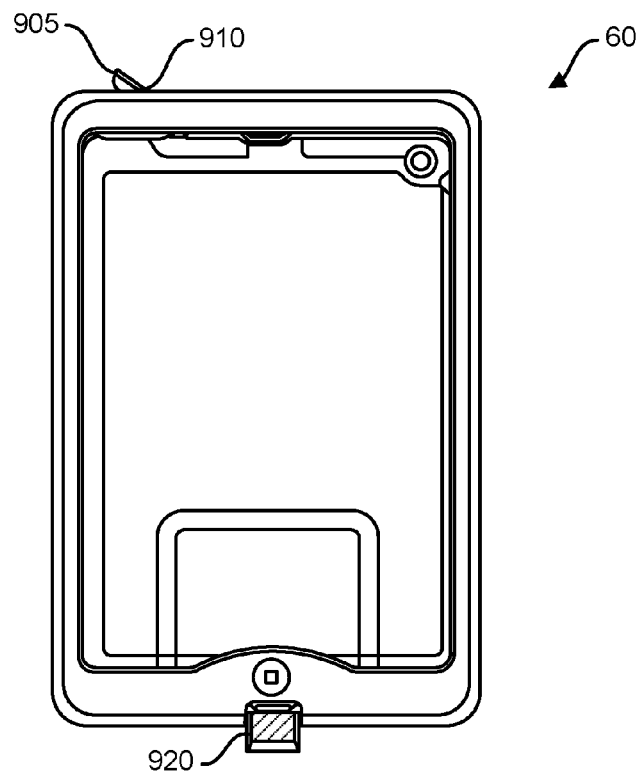
FIG. 9 shows a front view of a housing for a mobile electronic device, the housing having a port and a port-sealing bung attached to the housing by a tether.
Figure 10:
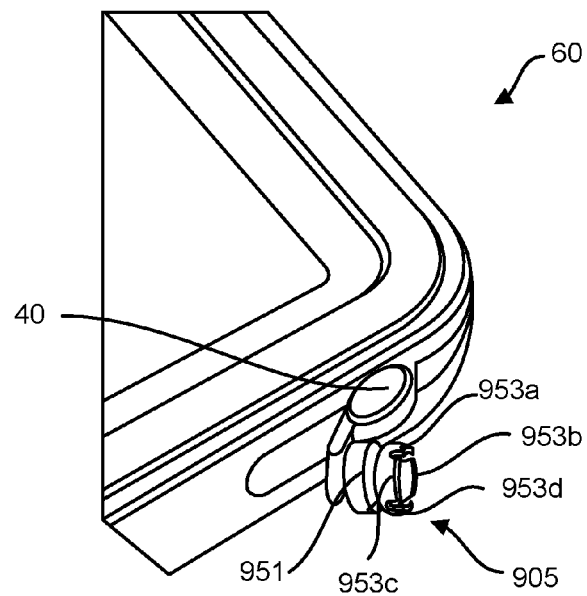
FIG. 10 shows a partial top perspective view of a housing of FIG. 9, the housing having a port and a port-sealing bung attached to the housing by a tether.

FIG. 9 shows a front view of a housing 60 for a mobile electronic device. The housing 60 can have a port 40 (i.e. connector aperture) in one of its external surfaces and a port-sealing bung 905 designed to seal the port by providing a liquid-tight seal therewith. The port-sealing bung 905 can be attached to the housing 60 by a tether 910. FIG. 10 shows a close-up top perspective view of a portion of the housing 60 of FIG. 9 showing the port 40 and port-sealing bung 905 in greater detail. The tether 910 can be a flexible portion that connects the port-sealing bung 905 permanently, semi-permanently, or removably to the housing 60. The tether 910 can be made of an elastomer, metal, fabric, or any other suitable material that can withstand exposure to liquids. In one example, the port-sealing bung 905 can have a body with a cylindrical or barrel shape. The port-sealing bung 905 can have an exterior gasket channel 951 located proximate an outer circumference of the body at or near a middle region of the body. The gasket channel 951 can be configured to receive a gasket or seal, such as an O-ring (the port-sealing bung 905 in FIG. 10 is shown prior to installation of the gasket or seal). The bottom end of the port-sealing bung 905 can include a perimeter, and the perimeter can include one, two, three, four, or more tension tabs (953a-d) extending therefrom. In one example shown in FIG. 10, the perimeter can include four tension tabs (953a-d) extending therefrom. Each tension tab (953a-d) can have a lip portion (e.g. 954b, 954d) extending outward radially (e.g. flaring outward) from the tension tab (i.e. extending outwardly from a centerline axis if the port-sealing bung). In other embodiments, the number of tension tabs may be two, three, five, six or more. The lip portions (954a-d) can project outwardly at a predefined angle from the tension tabs (953a-d) and can be configured such that the port-sealing bung 905 can be removably installed into the port 40 of the housing 60. In one example shown in FIG. 10, the lip portions (954a-d) can project outwardly from their respective tension tabs (953a-d) at an angle of about 45 degrees relative to a centerline axis 100 of the port-sealing bung 905. Depending on considerations relating to ease of insertion, ease of removal, and protection against inadvertent removal, the lip portions (954a-d) can project outwardly from the tension tabs (953a-d) at other suitable angles, such as about 1-15, 15-30, 1-60, 15-60, 15-45, or 30-45 degrees, relative to the centerline axis of the port sealing bung 905.

To ensure that water is unable to reach the mobile electronic device and cause damage to the mobile electronic device, it can be desirable for the port-sealing bung 905 to be firmly installed in the connector aperture 40. In one example, the port-sealing bung 905 may require a tool to uninstall the port-sealing bung 905 from the port 40. In one example, an extraction force of at least 15 newtons may need to be applied to the port-sealing bung 905 to uninstall the port-sealing bung from the port 40, where the extraction force is measured as a vector aligned with the centerline axis of the body of the port-sealing bung and directed away from the port 40. In another instance, an extraction force of at least 20 newtons may need to be applied to the port-sealing bung 905 to uninstall the port-sealing bung from the port 40, where the extraction force is measured as a vector aligned with the centerline axis of the body of the port-sealing bung and directed away from the port 40.

As shown in FIG. 9, the housing 60 can have a port (i.e. connector aperture) located in one of its external surfaces and a hinged door 920 designed to seal the port by providing a liquid-tight seal therewith. FIG. 9 shows the hinged door 920 in an opened position, exposing a sealing material disposed on an inner surface of the hinged door. The sealing material disposed on the hinged door 920 is represented by shading in FIG. 9. The hinged door 920 can provide access to an electrical connection, such as a charging port or data port of the mobile electronic device. The hinged door 920 can be attached to the housing 60 by any suitable hinged mechanism. To ensure that water is unable to reach the mobile electronic device and cause damage to the mobile electronic device, it can be desirable for the hinged door 920 to be firmly installed over the port when in the hinged door is in a closed position. In some examples, a tool may be required to open the hinged door 920 to expose the port in the housing 60. In one instance, an extraction force of at least 15 newtons may need to be applied to the hinged door 920 to expose the port in the housing 60, where the extraction force is measured as a vector aligned with a centerline axis of the port and directed away from the port. In another instance, an extraction force of at least 20 newtons may need to be applied to the hinged door 920 to expose the port in the housing 60, where the extraction force is measured as a vector aligned with a centerline axis of the port and directed away from the port. The necessary extraction force can be controlled by the magnitude of the interference fit between a locking feature of the hinged door 920 and a receiving feature located on the housing 60, where the locking feature of the hinged door is designed to produce an interference fit with the receiving feature when the hinged door is in a closed position. In some instances, the hinged door 920 may be removable from the housing 60 to permit replacement of the hinged door with a replacement hinged door that is easier or more difficult to transition from a closed position to an opened position to allow the housing to be modified to suit an intended use. For example, if the housing 60 will be used by an employee at a waterpark where the housing is frequently exposed to water and potential drops, the risk of water damage to the mobile electronic device is relatively high, so it can be desirable to install a hinged door 920 that is more difficult to open to reduce the risk of the hinged door inadvertently opening during use in a wet environment.

An accessory connector 9 for an accessory device can be configured to provide a liquid-tight seal when inserted into a connector aperture 40 of a waterproof housing 60 for a mobile electronic device. The accessory connector 9 can include a male connector 30 extending from a body 13 of the accessory connector. The body 13 can be configured to allow a user to grasp the accessory connector 9 during insertion or removal of the male connector 30 into or from, respectively, a female connector (see, e.g., female connector 72 of FIG. 8B) of the mobile electronic device. The accessory connector 9 can include a gasket 31 installed against a gasket seating surface 14 of the body 13. The gasket 31 can be configured to provide a liquid-tight seal against a gasket seating surface 41 of the connector aperture 40 of the waterproof housing 60 when the accessory connector is installed into the connector aperture 40. The accessory connector 9 can include a first cam feature 33a extending outwardly from the accessory connector. The first cam feature 33a can be configured to engage a first cam receiving feature 43a within the connector aperture 40 of a waterproof housing 60 when the accessory connector is installed into the connector aperture. The accessory connector can include a second cam feature 33b extending outwardly from the accessory connector 9. The second cam feature 33b can be configured to engage a second cam receiving feature 43b within the connector aperture 40 of the waterproof housing when the accessory connector is installed into the connector aperture. The second cam feature 43b can extend radially from a centerline axis 100 of the accessory connector in a direction that is aligned with and opposite to the direction in which the first cam feature 43a extends radially from the centerline axis. In one example, the gasket 31 can be an O-ring. In some examples, the male connector 30 can be a jack plug or a micro-USB connector. The accessory connector 9 can be configured to transfer power or data. The accessory connector 9 can be configured to transfer electrical or optical signals.

A waterproof adapter 50 can be configured to provide a liquid-tight seal between a waterproof housing 60 for a mobile electronic device 70 and an accessory connector 9 of an accessory device. The waterproof adapter 50 can include a body 59 having an exterior surface and a hole passing through a centerline axis 100 of the body as shown in FIGS. 6A-6C. The hole can define an interior surface of the body 59 of the waterproof adapter. The waterproof adapter 50 can include two or more tension tabs (e.g. 53a, 53b) extending from a first end of the body 59. Each tension tab can include a lip portion (e.g. 54a, 54b) that extends outwardly relative to the centerline axis 100 of the body 59. The waterproof adapter 50 can include an exterior gasket channel 51 on the exterior surface of the body 59. The exterior gasket channel 51 can circumscribe the exterior surface of the body 59. The waterproof adapter 50 can include an exterior gasket 52 disposed at least partially within the exterior gasket channel 51 on the exterior surface of the body 59, as shown in FIG.

8B. The waterproof adapter 50 can include an interior gasket seat 55 proximate the interior surface of the body. The waterproof adapter can include a first attachment feature on the interior surface of the body 59. The first attachment feature can be configured to attach to a second attachment feature on an accessory connector of an accessory device to form a liquid-tight seal between a jack plug gasket on the accessory connector and the interior gasket seat of the body. In one example, the attachment feature on the interior surface of the waterproof adapter 50 can be a threaded feature 56. In another example, the attachment feature on the interior surface of the waterproof adapter 50 can include two or more bayonet-style mounting features. Each tension tab (e.g. 53*a*, 53*b*) of the waterproof adapter 50 can include a receiving notch (e.g. 57*a*, 57*b*) proximate each lip portion (e.g. 54*a*, 54*b*), as shown in FIG. 6C. Each receiving notch (e.g. 57*a*, 57*b*) can be configured to receive an aperture protrusion (e.g. 64*a*, 64*b*) extending from an inner surface of a connector aperture 40 of the waterproof housing 60 for the mobile electronic device 70. Each lip portion (e.g. 54*c*) can be configured to associate with a lip receiving notch (e.g. 63) in a connection aperture 40 of the waterproof housing 60, as shown in FIG. 8B. In some examples, the exterior gasket 52 disposed within the exterior gasket channel 51 on the exterior surface of the body 59 of the waterproof adapter can be an O-ring.

A waterproof case for a mobile electronic device 70 can include a housing 60 that is adapted to cover at least a portion of the mobile electronic device. The mobile electronic device 70 can include an electrical or optical connector (e.g. 72) that is accessible proximate an external surface of the mobile electronic device. The waterproof case can include a connector aperture 40 extending through the housing 60. The connector aperture 40 can provide access to the mobile electronic device 70 encased in the housing 60. The connector aperture 40 can be located proximate the electrical or optical connector (e.g. 72) of the mobile electronic device 70 when the mobile electronic device is installed in the housing 60. A port-sealing bung 905 can be attached to the housing 60 by a tether 910, as shown in FIG. 10. The port-sealing bung 905 can be adapted to fit within the connector aperture 40 to provide a liquid-tight seal therewith. The port-sealing bung 905 can have a body having an exterior surface and two or more tension tabs (e.g. 953*a*, 953*b*) extending from a first end of the body. Each tension tab can include a lip portion (e.g. 954*a*, 954*b*) extending outwardly relative to a centerline axis of the body. The port-sealing bung 905 can include an exterior gasket channel 951 proximate the exterior surface of the body. The exterior gasket channel 951 can circumscribe the exterior surface of the body. An exterior gasket can be disposed at least partially within the exterior gasket channel 951 on the exterior surface of the body. The exterior gasket can be adapted to form a liquid-tight seal between the port-sealing bung 905 and an inner surface of the connector aperture 40 when the port-sealing bung is inserted into the connector aperture. Each tension tab can include a receiving notch configured to receive an aperture protrusion extending from the inner surface of the connector aperture 40 of the waterproof housing 60 when the port-sealing bung is installed in the connector aperture. The connector aperture 40 can include two or more lip receiving notches, and each lip receiving notch can be adapted to receive one or more of the lip portions of the port-sealing bung 905 when the port-sealing bung is inserted into the connector aperture 40. In some instances, a tool may be required to remove the port-sealing bung 905 from the connector aperture to avoid inadvertently uninstalling the port-sealing bung from the connector aperture during use of the waterproof case. Ensuring that the port-sealing bung 905 does not inadvertently come free of the connector aperture 40 during use is very important in certain applications, such as when using the protective case in the presence of flammable or explosive fumes or gases, such as on an offshore oil platform. In such an application, it can be critical for the case to completely contain any sparks that may occur within the electronic device as a result of static electricity or from ordinary operation. To ensure containment of any sparks within the electronic device, it is essential that the port-sealing bung 905 remain firmly in place within the connector aperture 40 during use. In some examples, when the port-sealing bung 905 is installed in the connector aperture 40, an extraction force of at least 15 newtons may need to be applied to the port-sealing bung to uninstall the port-sealing bung from the connector aperture, where the extraction force is aligned with the centerline axis 100 of the body of the port-sealing bung.

An accessory connector 9 for an accessory device can be configured to provide a liquid-tight seal when inserted into a connector aperture 40 of a waterproof housing 60 for a mobile electronic device 70. The accessory connector 9 can include a male connector 10 extending from a body 13 of the accessory connector. The body 13 of the accessory connector 9 can be configured to allow a user to grasp the accessory connector during insertion or removal of the male connector 10 into or from, respectively, a female connector 72 of a mobile electronic device 70. As shown in FIG. 7B, the accessory connector 9 can include a waterproof adapter 50 configured to provide a liquid-tight seal between the connector aperture 40 of the waterproof housing 60 and the accessory connector 9 of the accessory device. The waterproof adapter 50 can include two or more tension tabs (e.g. 53*a*, 53*b*) extending from a first end of the waterproof adapter. Each tension tab can include a lip portion that extends outwardly relative to a centerline axis 100 of the body of the male connector. The waterproof adapter 50 can include an exterior gasket channel 51 on an exterior surface of the waterproof adapter. The exterior gasket channel 51 can circumscribe the exterior surface of the waterproof adapter 50. An exterior gasket 52, which can be an O-ring, can be at least partially disposed within the exterior gasket channel 51 on the exterior surface of the waterproof adapter 50. In some examples, the waterproof adapter 50 can be removably attached to the accessory connector 9. In other examples, the waterproof adapter 50 can be an integrally formed portion of the accessory connector 9. The male connector 10 can be a jack plug, micro-USB connector, or other suitable type of male connector. The accessory connector 9 can be configured to transfer power or data. The accessory connector 9 can be configured to transfer electrical or optical signals.

A waterproof case for a mobile electronic device can include a housing 60 that is adapted to cover at least a portion of a mobile electronic device 70. The mobile electronic device 70 can include an electrical or optical connector 72 accessible proximate an external surface of the mobile electronic device. The waterproof case can include a connector aperture 40 extending through the housing 60. The connector aperture 40 can provide access to the mobile electronic device 70 encased in the housing 60. The connector aperture 40 can be located proximate the electrical or optical connector 72 of the mobile electronic device 70 when the mobile electronic device is installed in the housing 60. The connector aperture 40 can be configured to receive an accessory connector 9 of an accessory device. The accessory connector 9 can include a male connector 9 extending from a body 13 of the accessory connector. The body 13 can be configured to allow a user to grasp the accessory connector 9 during insertion or removal of the male connector into or from, respectively, the electrical or optical connector 72 of the mobile electronic device 70. A waterproof adapter 50 can be configured to provide a liquid-tight seal between the connector aperture 40 of the waterproof housing and the accessory connector 9 of an accessory device. The waterproof adapter 50 can include two or more tension tabs (e.g. 53*a*, 53*b*) extending from a first end of the waterproof adapter. Each tension tab can include a lip portion (e.g. 54*a*, 54*b*) that extends outwardly relative to a centerline axis 100 of the body 11 of the accessory connector 9. The waterproof adapter 50 can include an exterior gasket channel 51 on an exterior surface of the waterproof adapter. The exterior gasket channel 51 can circumscribe the exterior surface of the waterproof adapter 50. An exterior gasket 52 can be at least partially disposed within the exterior gasket channel 51 on the exterior surface of the waterproof adapter 50. The connector aperture 40 can include two or more lip receiving notches (e.g. 63), where each lip receiving notch is adapted to receive one or more of the lip portions (e.g. 54*a*, 54*b*) of the waterproof adapter 50 when the accessory connector 9 is inserted into the connector aperture 40 of the housing 60. Each tension tab (e.g. 53*a*) can include a receiving notch (e.g. 57*a*), and each receiving notch (e.g. 57*a*) can be configured to receive an aperture protrusion (e.g. 64*a*) extending from the inner surface of the connector aperture 40 of the waterproof case when the accessory connector 9 is installed in the connector aperture.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

The term "about" as used herein refers to a range of values including plus or minus 10% of a given value unless otherwise indicated.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present embodiments have been specifically disclosed by preferred embodiments and optional features, modification and variation of the embodiments disclosed herein may be resorted to by those skilled in the art, and that such modifications and variations are considered to be within the scope of this invention.

What is claimed is:

1. A waterproof adapter configured to provide a liquid-tight seal between a waterproof housing for a mobile electronic device and an electrical connector of an accessory for the mobile electronic device, the waterproof adapter comprising:
    a body having an exterior surface, a hole passing through the body, the hole defining an interior surface of the body, the body having a first attachment feature on the interior surface, the first attachment feature configured to attach to a second attachment feature on the electrical connector of the accessory device, the body having two or more tension tabs extending from a first end of the body;
    an exterior gasket disposed on the exterior surface of the body; and
    an interior sealing surface proximate the interior surface of the body, the first attachment feature of the body and the second attachment feature on the electrical connector configured to form a liquid-tight seal between the electrical connector and the sealing surface of the waterproof adapter.

2. The waterproof adapter of claim 1 wherein the electrical connector includes an electrical plug.

3. The waterproof adapter of claim 2 wherein the electrical plug is a headphone plug.

4. A waterproof adapter configured to provide a liquid-tight seal between a waterproof housing for a mobile electronic device and an accessory connector of an accessory device, the waterproof adapter comprising:
    a body having an exterior surface, a hole passing through the body, the hole defining an interior surface of the body, the body comprising a first attachment feature on the interior surface, the first attachment feature configured to attach to a second attachment feature on the accessory connector of the accessory device to form a liquid-tight seal between a gasket associated with the accessory connector and an interior gasket seat proximate the interior surface of the body, the body comprising two or more tension tabs extending from a first end of the body;
    an exterior gasket channel on the exterior surface of the body, the exterior gasket channel circumscribing the exterior surface of the body; and
    an exterior gasket disposed at least partially within the exterior gasket channel.

5. The waterproof adapter of claim 4, wherein the waterproof adapter is removably attachable to the accessory connector.

6. The waterproof adapter of claim 4, wherein the waterproof adapter is an integrally formed portion of the accessory connector.

7. A waterproof adapter configured to provide a liquid-tight seal between a waterproof housing for a mobile electronic device and an electrical connector of an accessory for use with the mobile electronic device, the electrical connector having a gasket, the waterproof adapter comprising:
    a body having:
        an exterior surface,
        a hole passing through the body, the hole defining an interior surface of the body,
        a first attachment feature on the interior surface of the body, the first attachment feature configured to attach to a second attachment feature of the electrical connector of the accessory to form a liquid-tight seal between the gasket of the electrical connector and an interior gasket seat proximate the interior surface of the body,
        a third attachment feature on the body;

two or more tension tabs extending from a first end of the body, each tension tab comprising a lip portion that extends outwardly relative to the body; and an exterior gasket disposed on the exterior surface of the body.

8. The waterproof adapter of claim 7, wherein each tension tab further comprises a receiving notch proximate each lip portion, each receiving notch configured to receive an aperture protrusion extending from an inner surface of a connector aperture of the waterproof housing for the mobile electronic device.

9. The waterproof adapter of claim 7, each lip portion configured to associate with a lip receiving notch in a connection aperture of the waterproof housing.

10. The waterproof adapter of claim 7 wherein the third attachment feature includes at least one of a threaded feature and two or more bayonet-style mounting features.

11. The waterproof adapter of claim 7, wherein the electrical connector is configured to transfer power and/or data to and/or from the mobile electronic device when the mobile electronic device is encased in the waterproof housing.

12. The waterproof adapter of claim 7, wherein each of the two or more tension tabs comprises a lip portion that extends outwardly relative to the body.

13. The waterproof adapter of claim 7 further comprising an exterior gasket channel on an exterior surface of the waterproof adapter, the exterior gasket disposed at least partially within the exterior gasket channel.

14. An accessory connector for an accessory device, the accessory connector configured to provide a liquid-tight seal when inserted into a connector aperture of a waterproof housing for a mobile electronic device, the accessory connector comprising:

a body having a connector extending from the body, the body configured to allow a user to grasp the accessory connector during insertion or removal of the accessory connector into or from, respectively, a corresponding connector of the mobile electronic device; and a waterproof adapter configured to provide a liquid-tight seal between the connector aperture of the waterproof housing and the accessory connector of the accessory device, the waterproof adapter comprising an exterior gasket on the exterior surface of the waterproof adapter.

15. The accessory connector of claim 14, wherein the waterproof adapter is removably attachable to the accessory connector.

16. The accessory connector of claim 14, wherein the waterproof adapter is an integrally formed portion of the accessory connector.

17. The accessory connector of claim 14, wherein the accessory connector is configured to transfer power or data to and/or from the mobile electronic device when the mobile electronic device is encased in the waterproof housing.

18. The accessory connector of claim 14, wherein each tension tab further comprises a lip portion that extends outwardly relative to a centerline axis of the body.

19. The accessory connector of claim 14, further comprising an exterior gasket channel on an exterior surface of the waterproof adapter, the exterior gasket disposed at least partially within the exterior gasket channel.

20. The accessory connector of claim 14 further comprising an exterior gasket on the exterior surface of the waterproof adapter.

* * * * *